United States Patent [19]

Earle, III et al.

[11] Patent Number: 4,778,317
[45] Date of Patent: Oct. 18, 1988

[54] TACTILE SENSING TOOL POSITIONING SYSTEM

[75] Inventors: George A. Earle, III, Dallas; Michael J. Wheetley, Bedford; Richard D. Button, Richardson, all of Tex.

[73] Assignee: LTV Aerospace & Defense Company, Dallas, Tex.

[21] Appl. No.: 818,447

[22] Filed: Jan. 13, 1986

[51] Int. Cl.$^4$ .................... B23B 39/14; B23C 1/12
[52] U.S. Cl. .................... 409/211; 408/13; 409/216
[58] Field of Search ............ 408/8, 13, 187, 87, 408/88, 73, 74, 75, 76, 77, 10, 11, 16, 12, 236; 409/178, 179, 204, 205, 211, 216, 199, 207

[56] References Cited

U.S. PATENT DOCUMENTS

| | | | |
|---|---|---|---|
| 2,813,958 | 11/1957 | MacDonald | 201/63 |
| 3,095,551 | 6/1963 | Hebert | 338/5 |
| 3,164,014 | 1/1965 | Redner | 73/141 |
| 3,237,450 | 3/1966 | Brooks, Jr. | 73/141 |
| 3,277,718 | 10/1966 | Ruge | 73/398 |
| 3,313,151 | 4/1967 | Kaye | 73/141 |
| 3,535,923 | 10/1970 | Martorana et al. | 73/141 |
| 3,572,181 | 3/1971 | Schlegel | 408/16 |
| 3,828,295 | 8/1974 | Bradley | 73/88.5 R |
| 3,973,859 | 8/1976 | Huber et al. | 408/12 |
| 4,051,451 | 9/1977 | Kurtz et al. | 73/141 A |
| 4,385,527 | 5/1983 | Raskin | 73/862.54 |
| 4,485,453 | 11/1984 | Taylor | 408/13 |
| 4,613,262 | 9/1986 | Woods | 409/216 X |

FOREIGN PATENT DOCUMENTS

| | | | |
|---|---|---|---|
| 1960440 | 6/1971 | Fed. Rep. of Germany | 408/76 |
| 1018811 | 5/1983 | U.S.S.R. | 408/8 |

Primary Examiner—Z. R. Bilinsky
Attorney, Agent, or Firm—S. S. Sadacca; J. M. Cate

[57] ABSTRACT

A tactile sensing tool positioning system for positioning a tool normal to the surface of a curved workpiece is disclosed. The tool positioning system of the present invention includes a steel frame for rigidly supporting a cutting tool having a longitudinal cutting implement, such as a drill bit or countersink bit. The steel frame includes a steel collar which is normal to the axis of the cutting implement and which supports a deformable ring of polyurethane or other resilient material. A plurality of aluminum cylinder positioning sensors are imbedded into the steel collar and surrounded by the deformable ring with one end of each aluminum cylinder positioning sensor contiguous with the exposed surface of the deformable ring. The axial loading experienced by each aluminum cylinder positioning sensor is measured by an associated strain gauge, and a quadrature circuit is then utilized to balance the forces on the aluminum cylinder positioning sensors and normalize the longitudinal cutting implement. In an alternate embodiment of the present invention two groups of aluminum cylinder positioning sensors are disposed in two separate planes both of which are normal to the axis of the cutting implement. By balancing the forces to determine arcs of equal loading, the longitudinal cutting implement with the surface of a highly curved workpiece may be calculated.

20 Claims, 2 Drawing Sheets

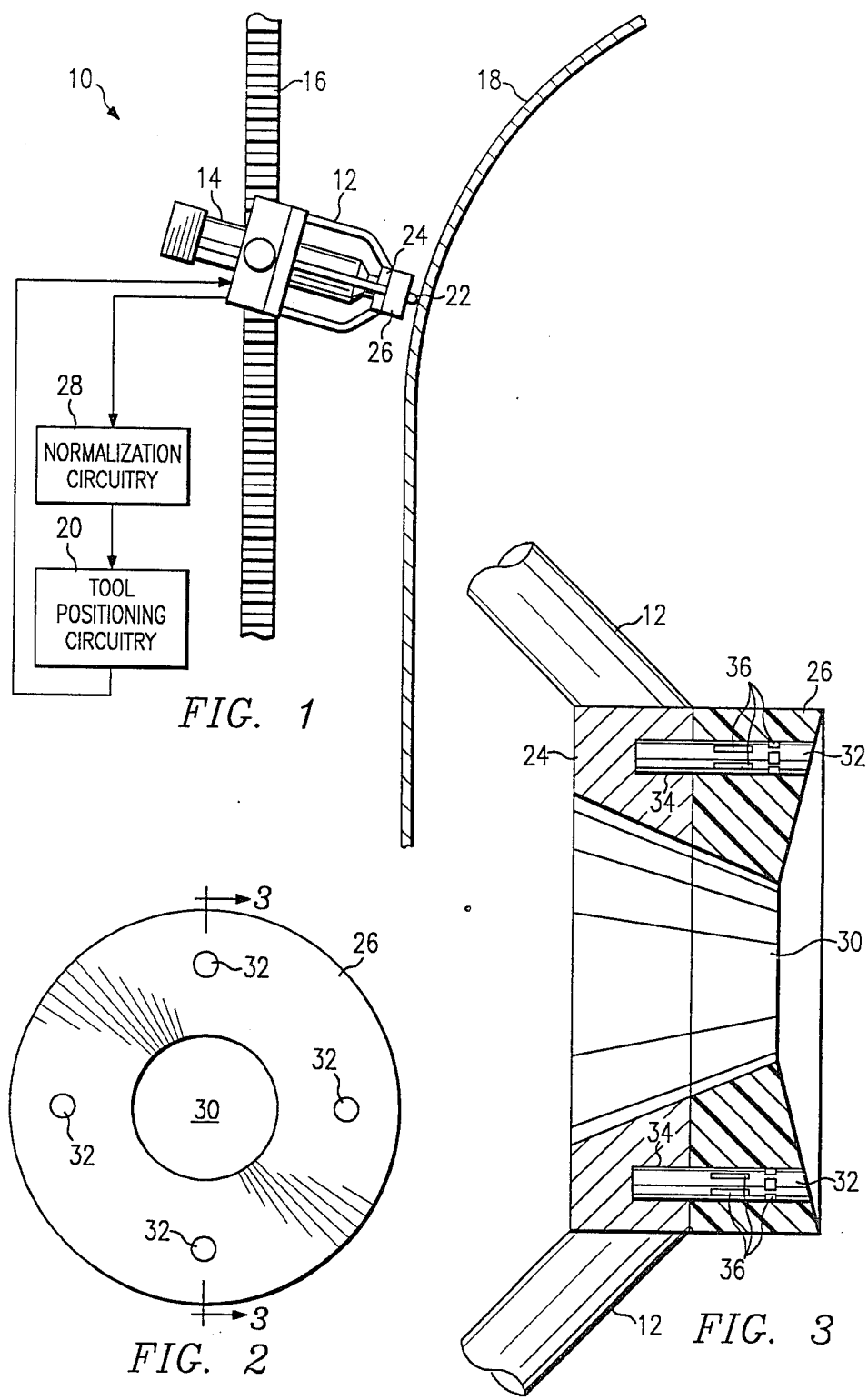

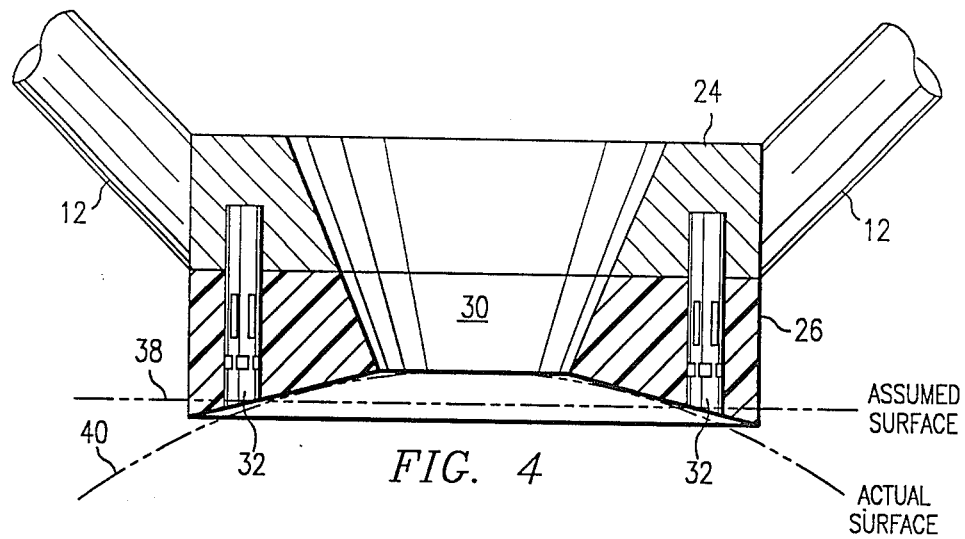
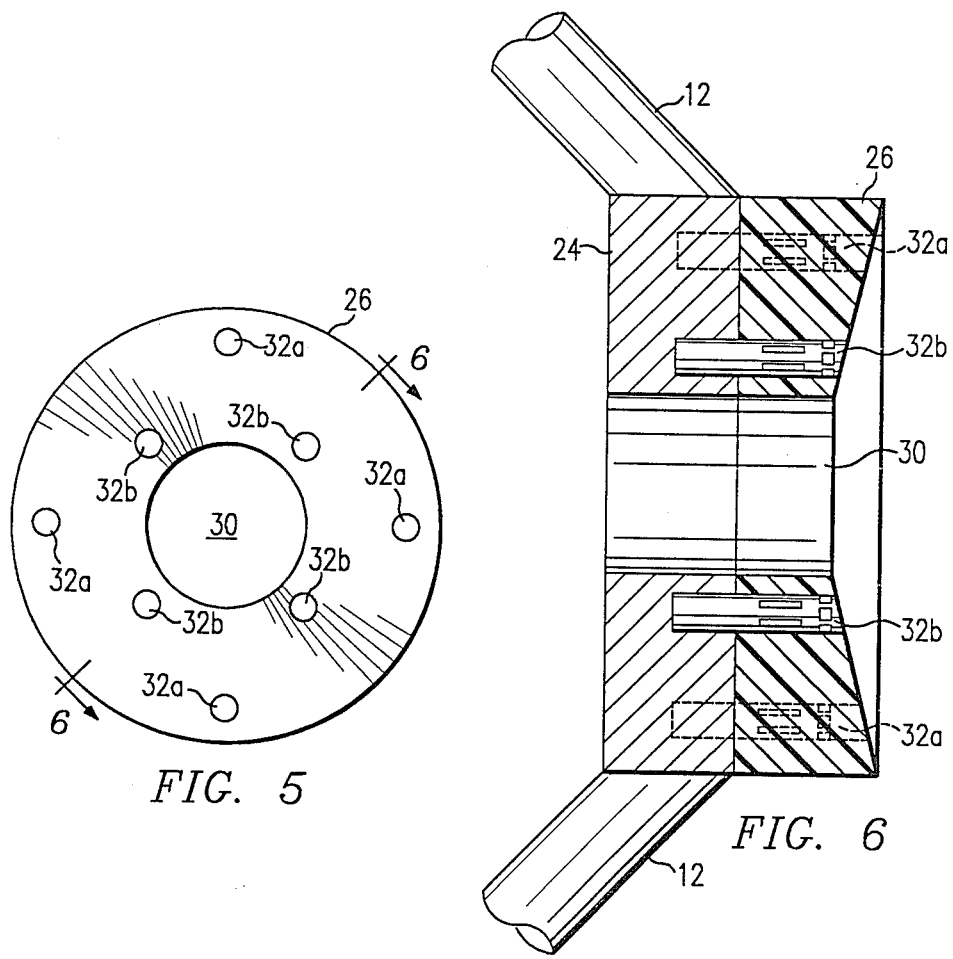

TACTILE SENSING TOOL POSITIONING SYSTEM

BACKGROUND OF THE INVENTION

This invention relates in general to tool positioning systems and in particular to tool positioning systems which permit accurate normalization of cutting implements with curved workpieces. Still more particularly this invention relates to tool positioning systems which permit the point of contact between a cutting implement and the surface of the curved workpiece to be accurately calculated.

A significant cost factor in the manufacture of aircraft structures involves the preparation of holes to accept the wide variety of screws, rivets and other fasteners utilized in aircraft fabrication. It is not uncommon for over one million holes to be required in the manufacture of a large aircraft and this particular task represents a major portion of the production cost. In recent years improvements have been made in automating various processes in the aircraft manufacturing industry; however, the application of these automated techniques to the drilling of contour shaped subassemblies has sadly lagged.

A major problem involved in known attempts to automate the drilling and riveting equipment necessary for aircraft manufacture involves the fact that this drilling must be performed in assembly fixtures on the production floor. Typically, these drilling operations are currently performed manually because the equipment and controls necessary to realize an automated system which possesses the necessary complexity to operate on a contour structure have not yet been developed. Such a system must be capable of operating in five axes of motion in order to properly drill contoured skins of aircraft structure, since each hole must be drilled with the cutting tool normal to the contour at the point of entry. Further such a system must be able to automatically adjust to ensure that the cutting implement is normal prior to penetration. Such a system would greatly reduce manufacturing costs on both metal and composite structures and result in a significant cost saving in the manufacture of large and small aircraft.

Recently, an automated drilling system has been disclosed in U.S. Pat. No. 3,973,859, issued to Huber et al. The Huber et al system teaches an automated technique for drilling compound curvature workpieces which are secured in a fixture by first scanning the workpiece with an optical camera to detect possible position variations. The optical camera is then removed and replaced with a tool manipulator head which includes a spherical bearing mounted between the cutting element and the nonworking end of the cutting tool. By manipulating the nonworking end of the cutting tool the cutting element can be rotated through an angular motion. However, since the rotational point for such manipulation lies at a point between the nonworking end of the cutting tool and the cutting element, the accuracy necessary for many aircraft operations is not available. Further, the complexity needed to calculate the position of the cutting element is increased due to the necessity of constantly calculating such position in view of the ratio of the distance between the spherical bearing and the surface of the workpiece.

A more reasonable approach to the problem of automated drilling operations is found in multi-axis numerically controlled or computer controlled drilling systems. However, prior art systems which incorporate computerized numerical control have generally been highly expensive, fragile and difficult to hold in a proper position. Therefore, it should be apparent that a need has existed for an automated controlled drilling system which may be simply and accurately operated to normalize a longitudinal cutting implement with the surface of a curved workpiece. Additionally, in certain applications, it is very important to determine the point at which the cutting implement will contact the surface of the workpiece. For example, in drilling a countersink the depth of penetration into the workpiece is very important. Therefore, a method of accurately calculating the position of the surface of a highly curved workpiece is highly desirable.

SUMMARY OF THE INVENTION

It is therefore one object of the present invention to provide an improved tool positioning system.

It is another object of the present invention to provide an improved drilling system.

It is still another object of the present invention to provide an improved tool positioning system which will automatically assume a position with a cutting implement normal to a contoured surface.

It is another object of the present invention to provide an improved tool positioning system which can automatically calculate the position of the surface of a highly curved workpiece.

The foregoing objects are achieved as is now described. The tool positioning system of the present invention includes a steel frame for rigidly supporting a cutting tool having a longitudinal cutting implement, such as a drill bit or countersink bit. The steel frame includes a steel collar which is normal to the axis of the cutting implement and which supports a deformable ring of polyurethane or other resilient material. A plurality of aluminium cylinder positioning sensors are imbedded into the steel collar and surrounded by the deformable ring with one end of each aluminum cylinder positioning sensor contiguous with the exposed surface of the deformable ring. The axial loading experienced by each aluminum cylinder positioning sensor is measured by an associated strain gauge, and a quadrature circuit is then utilized to balance the forces on the aluminum cylinder positioning sensors and normalize the longitudinal cutting implement. In an alternate embodiment of the present invention two groups of aluminum cylinder positioning sensors are disposed in two separate planes both of which are normal to the axis of the cutting implement. By balancing the forces to determine arcs of equal loading, the longitudinal cutting implement with the surface of a highly curved workpiece may be calculated.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 1 is a partially diagrammatic and partially schematic view of the novel tool positioning system of the present invention;

FIG. 2 is a plan view of a head assembly of the novel tool positioning system of the present invention;

FIG. 3 is a sectional view of the head assembly of the novel tool positioning system of the present invention taken along line 3—3 of FIG. 2;

FIG. 4 is a sectional view of the head assembly of the novel tool positioning system of the present invention which illustrates a problem which occurs with highly curved workpieces;

FIG. 5 is a plan view of a head assembly of a second embodiment of the novel tool positioning system of the present invention; and FIG. 6 is a sectional view of the head assembly of a second embodiment of the novel tool positioning system of the present invention depicted in FIG. 5, taken through line 6—6 of FIG. 5.

DETAILED DESCRIPTION OF THE PREFERRED EMBODIMENT

With reference now to the figures and in particular with reference to FIG. 1, there is depicted a partially diagrammatic and partially schematic view of tool positioning system 10 of the present invention. As can be seen, tool positioning system 10 includes a frame 12 which is suitable for receiving and rigidly supporting a cutting tool, such as drill 14. Frame 12 is preferably constructed of a highly rigid material such as steel and is preferably movably mounted to gear track 16 utilizing a series of gimbals (not shown) which permit frame 12 to be accurately positioned along the surface of curved workpiece 18 by tool positioning circuitry 20. Tool positioning circuitry 20 may be implemented utilizing any one of several commercial tool positioning controllers such as the Model No. 8200R, manufactured by Allen Bradley of Highland Heights, Ohio.

Extending from drill 14 is a longitudinal cutting implement 22 which may be a drill bit, or a countersink bit. Normal to the axis of longitudinal cutting implement 22 is collar 24 which forms an integral portion of frame 12. Collar 24 is also preferably constructed of a highly rigid material such as steel and serves to support deformable ring 26. Deformable ring 26 is preferably constructed utilizing polyurethane or some other resilient material. Deformable ring 26 contains the positioning sensors (not shown) which system 10 utilizes to position longitudinal cutting implement 22 normal to the surface of curved workpiece 18. The outputs from these positioning sensors are coupled to normalization circuitry 28 which is then utilized to generate inputs to tool positioning circuitry 20.

Those ordinarily skilled in the art will appreciate that while longitudinal cutting implement 22 is depicted as extending beyond deformable ring 26 for clarity's sake, in normal operation, the cutting implement will be carried in a retracted position until such time as deformable ring 26 has been positioned such that cutting implement 22 is normal to the surface of curved workpiece 18.

Referring now to FIGS. 2 and 3, the novel positioning sensors of tool positioning system 10 may be seen. As depicted in FIG. 2, four positioning sensors 32 are utilized in the first embodiment of novel tool positioning system 10 of the present invention. Preferably, positioning sensors 32 are disposed as depicted, equidistantly around the circumference of deformable ring 26. Each positioning sensor 32 comprises an aluminum cylinder 34 and associated strain gauges 36. Strain gauges 36 are preferably temperature compensated foil type strain gauges and each provides a signal indicative of the loading present on each aluminum cylinder 34. As may be seen, each aluminum cylinder 34 has a first end rigidly mounted within steel collar 24 and a second end which is contiguous with the exposed surface of deformable ring 26.

Force sensing with tool positioning system 10 is accomplished by measuring the strain present on each aluminum cylinder 34. The detected forces are directly proportional to the compression sensed on each aluminum cylinder 34 and are primarily axial in nature. Bridge circuit balancing techniques may be utilized to cancel out nonaxial loading or temperature effects, as those skilled in the art will appreciate and a standard quadrature circuit may be utilized to equalize the forces present on each positioning sensor 32. By encasing each positioning sensor 32 entirely within deformable ring 26, each sensor is protected and the contact surface or "head assembly" which contacts curved workpiece 18 is entirely polyurethane. Testing with tool positioning system 10 has proven that polyurethane provides an excellent balance of compliance, rigidity and coefficient of friction. Aluminum is preferably utilized for positioning sensors 32 since it provides a "softer" material than collar 24 and has great sensitivity to axial loading.

In selected operations (i.e. countersink drilling), the point at which longitudinal cutting implement 22 contacts the surface of curved workpiece 18 must be accurately determined. As illustrated in FIG. 4, this can become a severe problem with certain work surfaces. When equal axial loading has been achieved on each position sensor 32 depicted in FIG. 4, assumed surface 38 is a flat surface. In fact, actual surface 40, which is highly curved in nature, may in fact be detected. As can be seen, the difference in point of contact between assumed surface 38 and actual surface 40 may be substantial.

In order to correct the error illustrated in FIG. 4, a second embodiment of tool positioning system 10 may be utilized. As depicted in FIG. 5, a head assembly of a second embodiment of tool positioning system 10 is shown. The second embodiment of tool positioning system 10 includes four additional positioning sensors. In the depicted embodiment, positioning sensors 32a are disposed equidistantly around the outer edge of deformable ring 26, while positioning sensors 32b are disposed in a second plane, along the inner edge of deformable ring 26. The positioning of sensors 32a and 32b in two difference planes, both of which are normal to longitudinal cutting implement 22, may be better illustrated by reference to FIG. 6.

FIG. 6 depicts a sectional view of the head assembly of tool positioning system 10, taken along lines 6—6 of FIG. 5. As may be seen in this embodiment, equal load arcs may be drawn between multiple positioning sensors to find the arc of the surface of a curved workpiece. By utilizing as few as four positioning sensors, five separate arcs may be found in each plane and compared. Should one arc vary significantly from the remaining arcs it may be assumed that one or more of the associated sensors is resting upon an anomaly, (fastener head, dip, etc.) on the surface of the workpiece and that arc may be ignored. Valid arcs may then be averaged and the surface of curved workpiece may be simply calculated. Once the location of the surface of the curved workpiece has been calculated, the point of contact between longitudinal cutting implement 22 and the surface may be easily determined.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A tool positioning system for positioning a tool normal to the surface of a curved workpiece, said tool positioning system comprising:
   a rigid frame for receiving and supporting a tool having a longitudinal cutting implement;
   a rigid collar portion of said rigid frame, said rigid collar portion disposed circumferentially around said longitudinal cutting implement and normal to the axis thereof;
   a deformable ring disposed on said rigid collar portion;
   a plurality of rigid elongate members disposed within said deformable ring, each of said rigid elongate members having a first end imbedded in said rigid collar portion and a second end contiguous with the surface of said deformable ring;
   means for measuring the strain induced on each of said plurality of rigid elongate members in response to contact with said curved workpiece and for generating a signal in response thereto; and
   means for positioning said longitudinal cutting implement normal to the surface of said curved workpiece in response to said signal.

2. The tool positioning system according to claim 1 wherein said rigid frame is constructed utilizing steel.

3. The tool positioning system according to claim 1 wherein said tool comprises a drill.

4. The tool positioning system according to claim 1 wherein said longitudinal cutting implement comprises a drill bit.

5. The tool positioning system according to claim 1 wherein said rigid collar portion is constructed utilizing steel.

6. The tool positioning system according to claim 1 wherein said deformable ring is constructed utilizing polyurethane.

7. The tool positioning system according to claim 1 wherein said plurality of rigid elongate members comprise a plurality of aluminum cylinders.

8. The tool positioning system according to claim 7 wherein said means for measuring the strain induced on each of said plurality of aluminum cylinders comprises a plurality of strain gauges mounted on said plurality of aluminum cylinders.

9. The tool positioning system according to claim 7 wherein said plurality of aluminum cylinders comprises at least four aluminum cylinders.

10. A tool positioning system for position a tool normal to the surface of a curved workpiece, said tool positioning system comprising:
    a rigid frame for receiving and supporting a tool having a longitudinal cutting implement;
    a rigid collar portion of said rigid frame, said rigid collar portion disposed circumferentially around said longitudinal cutting implement and normal to the axis thereof;
    a deformable ring disposed on said rigid collar portion;
    a plurality of rigid elongate members disposed within said deformable ring and disposed equidistantly around said rigid collar portion, each of said plurality of rigid elongate members being parallel with said elongate cutting implement and having a first end imbedded in said rigid collar portion and a second end contiguous with the surface of said deformable ring;
    means for measuring the strain induced on each of said plurality of rigid elongate members in response to contact with said curved workpiece and for generating a signal in response thereto; and
    means for positioning said longitudinal cutting implement normal to the surface of said curved workpiece in response to said signal.

11. The tool positioning system according to claim 10 wherein said rigid frame is constructed utilizing steel.

12. The tool positioning system according to claim 10 wherein said rigid collar portion is constructed utilizing steel.

13. The tool positioning system according to claim 10 wherein said deformable ring is constructed utilizing polyurethane.

14. The tool positioning system according to claim 10 wherein said plurality of rigid elongate members comprise a plurality of aluminum cylinders.

15. The tool positioning system according to claim 10 wherein said plurality of aluminum cylinders comprises at least four aluminum cylinders.

16. A tool positioning system for positioning a tool normal to the surface of a curved workpiece, said tool positioning system comprising:
    a rigid frame for receiving and supporting a tool having a longitudinal cutting implement;
    a rigid collar portion of said rigid frame, said rigid collar portion disposed circumferentially around said longitudinal cutting implement and normal to the axis thereof;
    a deformable ring disposed on said rigid collar portion;
    a first plurality of rigid elongate members disposed within said deformable ring and disposed equidistantly around said rigid collar portion, each of said first plurality of rigid elongate members having a first end imbedded in said rigid collar portion and a second end contiguous with the surface of said deformable ring, each of said second ends being located in a first plane;
    a second plurality of rigid elongate members disposed within said deformable ring and disposed equidistantly around said rigid collar portion, each of said second plurality of rigid elongate members having a first end imbedded in said rigid collar portion and a second end contiguous with the surface of said deformable ring, each of said second ends being located in a second plane;
    means for measuring the strain induced on each of said first and second pluralities of rigid elongate members in response to contact with said curved workpiece and for generating a signal in response thereto; and
    means for positioning said longitudinal cutting implement normal to the surface of said curved workpiece in response to said signal.

17. The tool positioning system according to claim 16 wherein said rigid frame is constructed utilizing steel.

18. The tool positioning system according to claim 16 wherein said rigid collar portion is constructed utilizing steel.

19. The tool positioning system according to claim 16 wherein said deformable ring is constructed utilizing polyurethane.

20. The tool positioning system according to claim 16 wherein each of said first and second pluralities of rigid elongate members comprises a plurality of aluminum cylinders.

* * * * *